April 27, 1926.
J. F. STEPHENS
SEED AND FERTILIZER DISTRIBUTOR
Filed Sept. 9, 1925
1,582,798
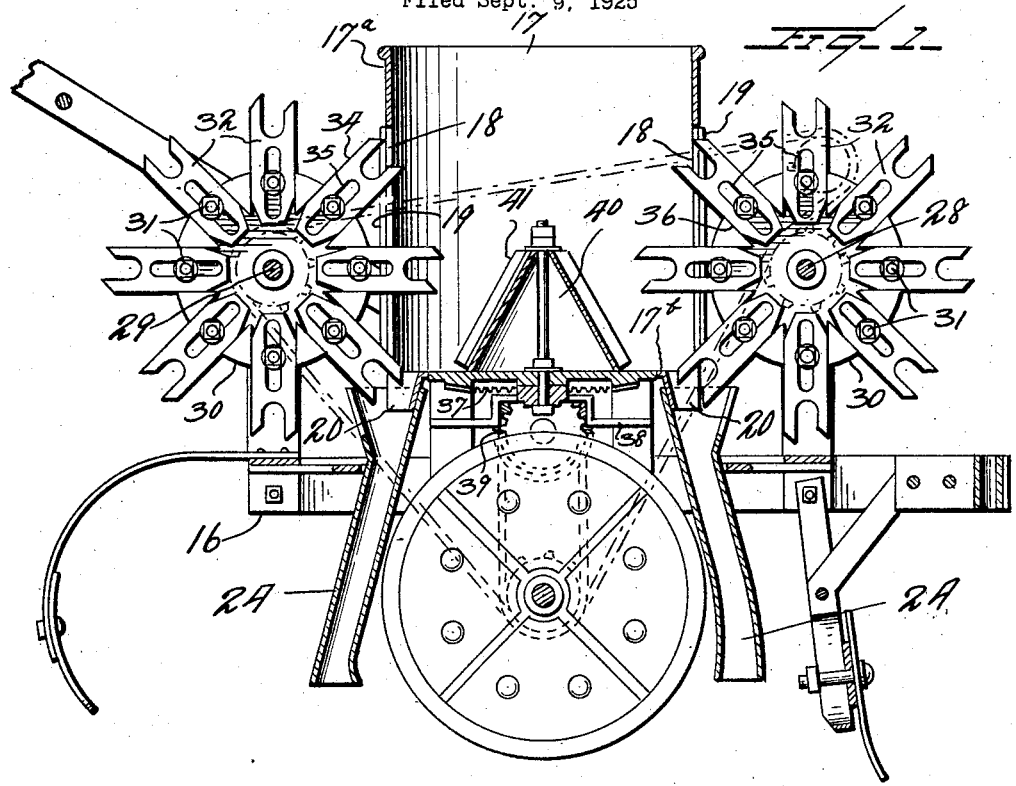
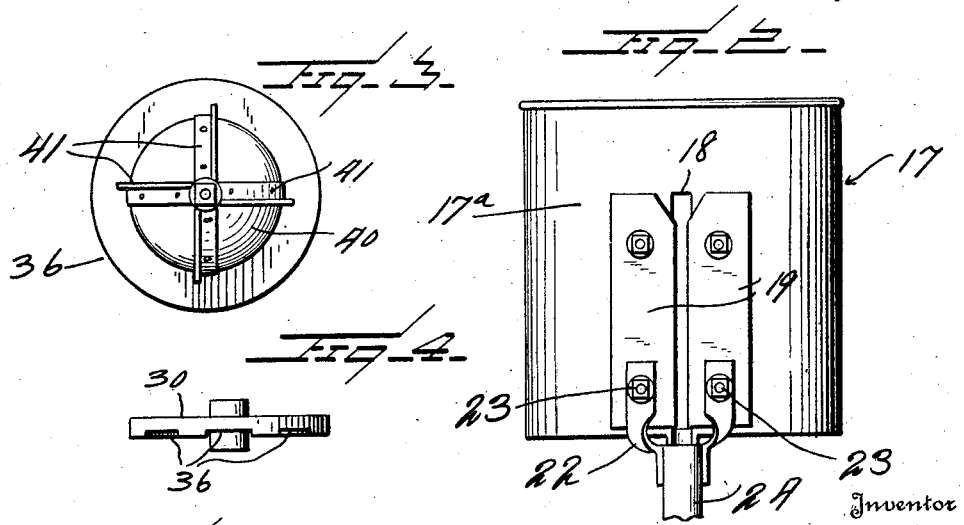
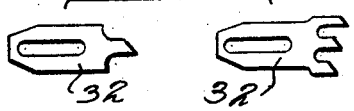
Inventor
J. F. Stephens
By Watson E. Coleman
Attorney Patented Apr. 27, 1926.

1,582,798

UNITED STATES PATENT OFFICE.

JAMES FRANCIS STEPHENS, OF NEWBERRY, SOUTH CAROLINA, ASSIGNOR OF ONE-HALF TO NATHANIEL GIST, OF NEWBERRY, SOUTH CAROLINA.

SEED AND FERTILIZER DISTRIBUTOR.

Application filed September 9, 1925. Serial No. 55,364.

*To all whom it may concern:*

Be it known that I, JAMES FRANCIS STEPHENS, a citizen of the United States, residing at Newberry, in the county of Newberry and State of South Carolina, have invented certain new and useful Improvements in Seed and Fertilizer Distributors, of which the following is a specification, reference being had to the accompanying drawings.

This invention relates to seed or seed and fertilizer distributors for cotton planters and is an improvement on the machine disclosed in my pending application, Serial No. 17,346, filed March 21, 1925, for cotton planters, certain changes having been made in the construction of the picker teeth employed in the construction shown in the pending application.

I have found that in cotton planting, the only method of securing, with any degree of certainty, a proper stand is to employ what is known as double depth planting, that is to say, a planting in where two groups of seeds are planted in the same row, one at a lower and another at a higher level. If the season be dry, the lower level will supply the stand while if the season is wet, the upper level supplies the stand. A planter for accomplishing this purpose is shown in the pending application above mentioned.

The seed distributor disclosed in the present application is constructed to permit feeding of the seed for this double stand so that the amount of seed fed to each stand may be very readily regulated without using two feed hoppers. Close regulation of the amount of seed fed is necessary due to the fact that often at planting time it will be apparent that the on-coming season will probably be either wet or dry in which event, it is desirable that the seeds planted at the depth that will probably not supply the stand be either completely discontinued or only seeded at relatively long intervals. To this end, feeding disks are provided having picker teeth which may be increased or decreased in number, as is found desirable, and the feeding disks themselves are so constructed that they may be thrown out of operation at any time, if this is found desirable.

The invention resides in the details of construction hereinafter described and illustrated in the accompanying drawings, wherein I have disclosed a preferred embodiment of my invention and wherein:—

Figure 1 is a vertical sectional view through a cultivator embodying a feed hopper constructed in accordance with my invention;

Figure 2 is a side elevation of the feed hopper;

Figure 3 is a top plan view of the agitating element and the rotating support therefor;

Figure 4 is an edge elevation of the tooth;

Figure 5 is a combined side elevation illustrating the fact that the tooth bearing elements may have any desired number of teeth.

Referring now more particularly to the drawings, the numeral 16 designates a frame for the planter having arranged thereon centrally thereof a hopper 17 which is formed upon the longitudinal center of the machine with vertically extending slots 18 opening through its side walls 17$^a$ and through the adjacent portions of the bottom wall 17$^b$ thereof. Mounted upon the walls of the hopper at opposite sides of each slot 18 are adjustable slides 19 which may be shifted to regulate the size of the opening represented by the slots 18. Those portions of the slots opening through the bottom of the hopper have formed thereabout a short spout 20 which is downwardly directed and has its rear wall open. Secured to the hopper by means of supporting straps 22 engaged with the lower securing elements 23 of the plates 19 are downwardly extending seed boots 24.

At opposite sides of the hopper and supported from the frame are shafts 28 and 29 to each of which is secured a disk 30. The disks 30 have hubs engaging the shafts and provided with set-screws for holding the disks against rotation so that these disks may be freed from rotation at any time it is found desirable. To these disks are removably secured by securing elements 31 picker teeth carrying members 32 having teeth 33. This member 32 may have any desired number of teeth, there having been illustrated members 32 having one, two and three teeth.

Each tooth has parallel side edges 34 and is formed with a longitudinally extending slot 35 through which the securing element 31 is directed so that the teeth may be adjusted toward and away from the hub of the disk. To guide the teeth, the face of the disk is formed with radially directed grooves 36 against which the parallel side edges of the members 32 engage. Where the members 32 have more than one tooth, the tooth which is arranged in advance, as regards the direction of rotation of the disk, will be of a given length and each succeeding tooth will be slightly longer than the preceding tooth so that a uniform amount of seed will be fed by each tooth.

It will, of course, be understood that the number of teeth together with the number of members 32 which are applied to the wheel will control the amount of seed which are fed through the boots. If the three tooth elements 32 are employed and eight of these elements are used, there will be twenty-four units of seed fed to the boot for each rotation of the disk and a substantial "drilling" of the seed in each stand, while if a single tooth element 32 is employed, one-third the amount of seed will be fed through the boots to the stand. Accordingly, by arranging the elements 32, a "drilling" may be accomplished through one boot 24 while but a scattered seeding provided through the other boot. If desired, by releasing the set-screws, the feed of one of the disks may be entirely discontinued.

In order to maintain seed within the compartment at all times in the path of the picker teeth, the central portion of the bottom 17$^b$ is in the form of a rotatable disk 36, the under surface of which may be provided with a bevel gear 37 driven from a gear 39 connected with any suitable source of power. This rotatable disk is supported by a bracket 38 which is in turn supported from the main frame. Upon the upper surface of this disk is arranged a cone 40 having stirring blades 41 for agitating the contents of the hopper.

It will, of course, be obvious that the construction hereinbefore set forth is obviously capable of a certain range of change and modification without materially departing from the spirit of my invention and I accordingly do not limit myself to such specific structure except as hereinafter claimed.

I claim:—

1. In a cotton seed planter, a hopper having a vertically extending slot, a disk rotatable adjacent the hopper and substantially aligned with said slot, picker teeth carrying elements carried by the disk and adapted to engage in the slot and means for radially adjusting said picker teeth carrying elements upon the disk to thereby regulate the extent of projection of the picker teeth thereof into the slot, each of the picker teeth carrying elements having a plurality of teeth, the teeth in advance, as regards the direction of rotation of the disk, being the shorter, each succeeding tooth being longer than the next preceding tooth of the element.

2. In a cotton seed planter, a hopper having a vertically extending slot, a disk rotatable adjacent the hopper and substantially aligned with said slot, picker teeth carrying elements carried by the disk and adapted to engage in the slot and means for radially adjusting said picker teeth carrying elements upon the disk to thereby regulate the extent of projection of the picker teeth thereof into the slot, said elements having each in the shank thereof a longitudinally extending slot to permit such adjustment, one side face of the disk having radially directed grooves, the teeth carrying elements having parallel side walls engaging the sides of the groove in which they are disposed to thereby maintain the element against angular displacement upon the disk and headed securing elements extending through the slots of the picker teeth carrying elements and engaged in the disk.

In testimony whereof I hereunto affix my signature.

JAMES FRANCIS STEPHENS.